United States Patent [19]

Illmann et al.

[11] Patent Number: 4,522,899
[45] Date of Patent: Jun. 11, 1985

[54] GAS AND LIQUID TIGHT POLE SEAL FOR ELECTRIC STORAGE BATTERIES, PARTICULARLY LEAD STORAGE BATTERIES

[75] Inventors: Joachim Illmann; Klaus Gummelt, both of Garbsen, Fed. Rep. of Germany

[73] Assignee: Varta Batterei A.G., Hanover, Fed. Rep. of Germany

[21] Appl. No.: 532,704

[22] Filed: Sep. 16, 1983

[30] Foreign Application Priority Data

Oct. 1, 1982 [DE] Fed. Rep. of Germany ....... 3236370

[51] Int. Cl.³ .............................................. H01M 2/08
[52] U.S. Cl. ..................................... 429/181; 429/185
[58] Field of Search ............... 429/181, 185, 180, 174, 429/173, 184

[56] References Cited

U.S. PATENT DOCUMENTS

| | | | |
|---|---|---|---|
| 2,926,210 | 2/1960 | Sturges | 429/181 |
| 4,278,744 | 7/1981 | Athearn | 429/181 |
| 4,410,610 | 10/1983 | Quist | 429/181 |

FOREIGN PATENT DOCUMENTS 0143776 11/1980 Japan .................................. 429/181

Primary Examiner—Anthony Skapars
Attorney, Agent, or Firm—Weiser & Stapler

[57] ABSTRACT

A hermetic pole seal for lead storage batteries which averts the customary use of lead sleeves, involves a first ring-shaped molding surrounding the pole shaft with a rubber-elastic synthetic plastic (thermoplastic rubber) and a second molding covering the former with a less elastic synthetic, which is preferably identical to the case material (e.g. polypropylene), followed by mirror welding to the lid. The sealing of the pole lead-through results from material shrinkage following the molding. In so doing, the different plastics mesh from opposite sides.

7 Claims, 2 Drawing Figures

GAS AND LIQUID TIGHT POLE SEAL FOR ELECTRIC STORAGE BATTERIES, PARTICULARLY LEAD STORAGE BATTERIES

The invention relates to a gas and liquid tight pole seal for electric storage batteries, and particularly lead storage batteries whose case consists of plastic.

In the pole lead-throughs which are still customary today, there are used as the pass-through elements lead sleeves which are pressed into the case lid or molded for that purpose. The pole shafts are led through the apertures in the sleeves and are welded to these lead sleeves. Although the lead sleeve lead-throughs in the case lid are initially sealed after manufacture, this seal is lost under the influence of heat during the subsequent welding treatment due to shrinkage of the plastic. Because of the differential heat expansion of metal and plastic, capillary cracks are formed, which lead to escape of the acid with unwanted corrosion effects.

However, pole seal without lead sleeves are also known. In these it has been attempted, e.g. through adhesives, to produce a hermetic seal between the metallic pole take-off conductor and the case material. For example, from German patent publication (Offenlegungsschrift) No. 30 35 842, there is known a pole seal in which the plastic lid is enlarged in kettle shaped manner around the pass-through aperture for the pole shaft and is then filled layer by layer with different molding materials. In so doing molten adhesive forms the middle layer and a hard molded material of an acid resistant two-component resin forms the respective adjoining bottom and top layers.

Molding around the pole shaft in three consecutive steps is complicated. Moreover, in mass production, molding processes are preferably avoided in any event.

Accordingly, it is an object of the invention to provide a pole seal which is simple to produce and nevertheless meets the most stringent tightness requirements.

This and other objects which will appear are achieved in accordance with the invention by providing the pole shaft with a first, ring shaped molding of a rubber elastic, thermoplastic synthetic plastic material and by then surrounding this first molding completely by molding with a second, less elastic plastic material.

This invention will be better understood with reference to the accompanying drawings wherein.

Figure 1:
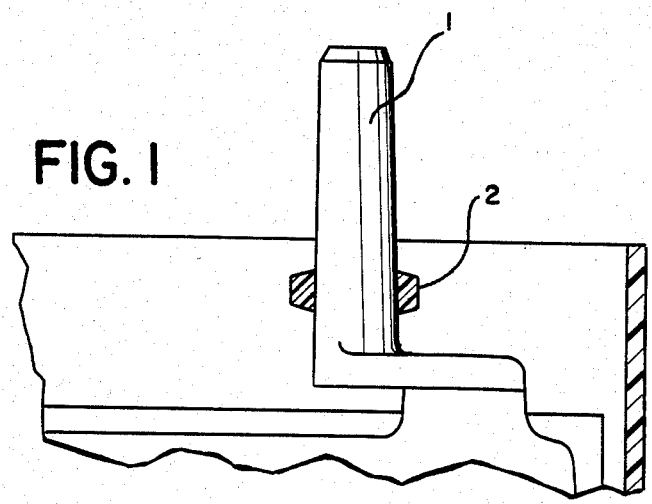
FIG. 1 shows the pole seal in its first manufacturing stage: the pole shaft with the first ring shaped surround molding.

As shown in FIG. 1, the pole shaft 1 is first surrounded by injection molding with an annular synthetic plastic 2 which is rubber-elastic and thermoplastic. A material which is particularly suitable for the inventive purpose is a thermoplastic rubber. Such a synthetic rubber is a "thermoplastic elastomer" within that group of thermoplastic synthetics which retain their rubber-elastic properties over a wide range of temperatures up to their flow temperature. To these synthetic rubbers there belong, among others, cis-1,4-polyisoprene, styrene-butadiene rubber, cis-1,4-poly-butadiene, nitrile rubber, urethane rubber, acrylic ester rubber, chlorosulfonated polyethylene, silicone rubber. For the invention there has been found to be particularly suitable as the thermoplastic rubber a modified polyolefin with the commercial name "Vestopren TP" (a product of the Chemische Werke Huls AG, D-4370 Marl 1, Federal German Republic).

Figure 2:
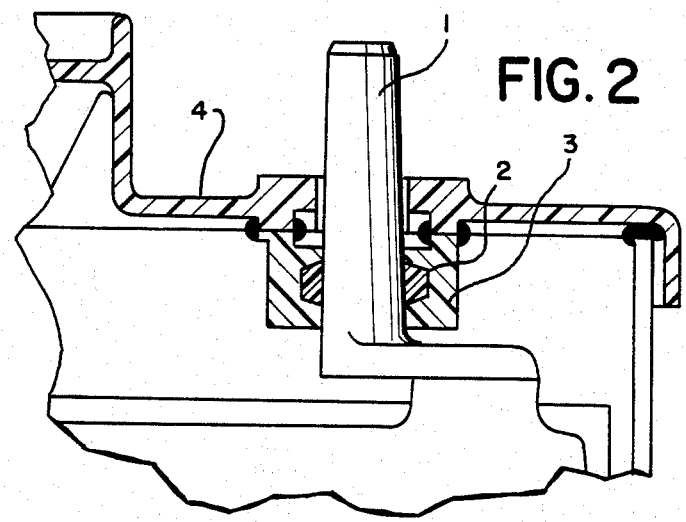
FIG. 2 shows the completed pole seal, and particularly the pole shaft with its double-surround molding.

In a subsequent manufacturing stage, the ring-shaped region of the elastic plastic 2 is surrounded through injection molding with a less elastic plastic 3 so that the first surround molding is completely covered. For the second surround molding, there is preferably used the same plastic material as the case material, customarily polyethylene or polypropylene. In this manner, the second surround molding can be smoothly mirror welded to the case lid 4, as is shown in FIG. 2. Instead of mirror welding, ultrasonic welding, or friction welding processes can also be used.

These techniques embodying the invention have the effect of saving substantial material as compared with conventional pole lead-throughs using lead sleeves. However, even in comparison with known lead-throughs which lack pole sleeves, they are less burdensome to manufacture and at least equally reliable with respect to their sealing effect.

The seal embodying the invention is created because, after the first surround molding, shrinkage of the elastic material permits the creation of small voids, and these are filled and closed by the plastic of the second surround molding, which is initially subjected to high molding pressure and thereafter also to shrinkage. In so doing, there also arise shrinkage voids in the second surround molding, into which the rubber-elastic material of the first surround molding penetrates through deformation. In this manner, there takes place along the boundary layer between the two surround moldings, an intimate and permanent meshing of the two different plastics. This, in turn, leads to exceptional durability of the seal over the lifetime of the storage battery.

What is claimed is:

1. For an electric storage battery having a pole shaft extending therefrom, particularly a lead storage battery having a case formed of plastic, a gas and liquid tight pole seal wherein a first, ring-shaped molding formed of an elastic thermoplastic synthetic surrounds the pole shaft, and a second molding formed of a less elastic plastic material completely surrounds the first molding.

2. The pole seal of claim 1 wherein the first molding is formed of a thermoplastic rubber.

3. The pole seal of claim 2 wherein the thermoplastic rubber is a modified polyolefin.

4. The pole seal of claim 2 wherein the the thermoplastic rubber is an elastomer which retains its elastic properties over a range of temperatures up to the elastomer's flow temperature.

5. The pole seal of claim 4 wherein the thermoplastic rubber is selected from the group consisting of cis-1,4-polyisoprene, styrene-butadiene rubber, cis-1,4-polybutadiene, nitrile rubber, urethane rubber, acrylic ester rubber, chlorosulfonated polyethylene, and silicone rubber.

6. The pole seal of claim 1 wherein the less elastic plastic material corresponds to the plastic of the case.

7. The pole seal of claim 6 wherein the less elastic plastic material is polypropylene.

* * * * *